US012634103B2

(12) United States Patent
Harada et al.

(10) Patent No.: US 12,634,103 B2
(45) Date of Patent: May 19, 2026

(54) USER TERMINAL, RADIO BASE STATION AND RADIO COMMUNICATION METHOD

(71) Applicant: NTT DOCOMO, INC., Tokyo (JP)

(72) Inventors: Hiroki Harada, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/755,689

(22) PCT Filed: Aug. 26, 2016

(86) PCT No.: PCT/JP2016/074952
§ 371 (c)(1),
(2) Date: Feb. 27, 2018

(87) PCT Pub. No.: WO2017/038672
PCT Pub. Date: Mar. 9, 2017

(65) Prior Publication Data
US 2018/0255572 A1     Sep. 6, 2018

(30) Foreign Application Priority Data

Sep. 1, 2015     (JP) ................................. 2015-172357

(51) Int. Cl.
H04L 5/14          (2006.01)
H04L 5/00          (2006.01)
(Continued)

(52) U.S. Cl.
CPC .......... H04L 5/1469 (2013.01); H04L 5/0048 (2013.01); H04L 5/0091 (2013.01);
(Continued)

(58) Field of Classification Search
CPC ............. H04W 74/008; H04W 72/042; H04W 74/0833; H04W 72/04; H04W 56/00; H04L 27/2613; H04L 5/0048; H04L 5/0091
(Continued)

(56) References Cited

U.S. PATENT DOCUMENTS 7,979,022 B2     7/2011   Cho et al.
8,532,049 B2 *   9/2013   Higuchi .................. H04L 47/10
                                                               370/330
(Continued)

FOREIGN PATENT DOCUMENTS

JP          2008-507192 A       3/2008
JP          2010-158000 A       7/2010
(Continued)

OTHER PUBLICATIONS

WO2014166032A1_SUN_1632 (Year: 2013).*
(Continued)

*Primary Examiner* — Mohammed S Chowdhury
(74) *Attorney, Agent, or Firm* — Osha Bergman Watanabe & Burton LLP

(57) ABSTRACT

A user terminal used in a radio communication system in which downlink (DL) and uplink (UL) are switchable per transmission time interval (TTI), the user terminal is disclosed including a receiver that receives a DL signal in a DL TTI. The user terminal also includes a processor that controls reception of the DL signal by determining whether each TTI is the DL TTI or not based on a signal configuration of each TTI.

2 Claims, 10 Drawing Sheets

(51) Int. Cl.

| | |
|---|---|
| *H04L 27/26* | (2006.01) |
| *H04W 56/00* | (2009.01) |
| *H04W 72/04* | (2023.01) |
| *H04W 72/23* | (2023.01) |
| *H04W 74/00* | (2009.01) |
| *H04W 74/0833* | (2024.01) |

(52) U.S. Cl.
CPC .... *H04L 27/26025* (2021.01); *H04L 27/2613* (2013.01); *H04W 56/00* (2013.01); *H04W 72/04* (2013.01); *H04W 72/23* (2023.01); *H04W 74/002* (2013.01); *H04W 74/0833* (2013.01)

(58) Field of Classification Search
USPC .......................................................... 370/252
See application file for complete search history.

(56) References Cited

U.S. PATENT DOCUMENTS

| | | | | |
|---|---|---|---|---|
| 8,942,142 | B2 | 1/2015 | Lin | |
| 2009/0103569 | A1* | 4/2009 | Cho | H04L 27/2656 370/498 |
| 2013/0039331 | A1 | 2/2013 | Koorapaty et al. | |
| 2013/0195019 | A1* | 8/2013 | Lindh | H04L 5/0053 370/329 |
| 2014/0269452 | A1* | 9/2014 | Papasakellariou | H04L 5/0055 370/280 |
| 2014/0269460 | A1* | 9/2014 | Papasakellariou | H04L 5/0048 370/294 |
| 2014/0293843 | A1* | 10/2014 | Papasakellariou | H04W 52/325 370/280 |
| 2014/0349645 | A1* | 11/2014 | Webb | H04W 52/0206 455/435.1 |
| 2015/0188690 | A1* | 7/2015 | Khoryaev | H04L 5/0055 370/280 |
| 2015/0189574 | A1* | 7/2015 | Ng | H04W 52/245 370/254 |
| 2015/0382205 | A1* | 12/2015 | Lee | H04B 7/0417 370/329 |
| 2016/0021632 | A1* | 1/2016 | Sun | H04W 56/001 370/350 |
| 2016/0119920 | A1* | 4/2016 | Mallik | H04L 5/001 370/336 |
| 2016/0205664 | A1* | 7/2016 | Zhang | H04L 5/005 370/312 |
| 2016/0374079 | A1 | 12/2016 | Yasukawa et al. | |
| 2018/0184390 | A1* | 6/2018 | Wu | H04L 27/2613 |
| 2018/0205534 | A1* | 7/2018 | Yi | H04J 3/02 |

FOREIGN PATENT DOCUMENTS

| | | |
|---|---|---|
| JP | 2014-531145 A | 11/2014 |
| JP | 2015-133643 A | 7/2015 |
| WO | 2016064522 A1 | 4/2016 |

OTHER PUBLICATIONS

International Search Report of the International Searching Authority issued in PCT/JP2016/074952 mailed on Nov. 15, 2016 (2 pages).

Written Opinion of the International Searching Authority issued in PCT/JP2016/074952 mailed on Nov. 15, 2016 (4 pages).

NTT Docomo, Inc.; "Discussion on discontinuous transmission and scheduling design for LAA DL"; 3GPP TSG RAN WG1 Meeting #82, R1-154406; Beijing, China; Aug. 24-28, 2015 (5 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

Extended European Search Report issued in the counterpart European Patent Application No. 16841704.6, mailed Mar. 28, 2019 (7 pages).

Office Action issued in the counterpart Japanese Patent Application No. 2017-537830, mailed Jul. 7, 2020 (6 pages).

Office Action in counterpart European Patent Application No. 16 841 704.6 issued on Jun. 19, 2020 (6 pages).

Office Action issued in the counterpart Japanese Patent Application No. 2017-537830, mailed Jan. 5, 2021 (6 pages).

Office Action in counterpart Japanese Patent Application No. 2017-537830 issued on May 12, 2021 (7 pages).

Office Action issued in the counterpart European Patent Application No. 16841704.6, mailed on Jun. 9, 2021 (8 pages).

Office Action in the corresponding European Application No. 16841704. 6, mailed Jun. 14, 2023 (14 pages).

\* cited by examiner

5G Cell (Small Cell)

LTE Cell (Macro Cell)

Macro cell

Small cell

Freq.

LTE RAT

5G New RAT

USER TERMINAL, RADIO BASE STATION AND RADIO COMMUNICATION METHOD

CROSS REFERENCE TO RELATED APPLICATIONS

The present application is a national phase application of PCT/JP2016/073738 filed on Aug. 12, 2016, which claims priority to Japanese Patent Application No. 2015-172357, filed on Sep. 1, 2015. The contents of these applications are incorporated by reference in their entirety.

FIELD OF THE INVENTION

The present invention relates to a user terminal, a radio base station and a radio communication method in a next-generation communication system.

BACKGROUND

In a Universal Mobile Telecommunications System (UMTS) network, for the purposes of achieving higher-speed data rates, providing low delay and so on, long-term evolution (LTE) has been standardized (see Non Patent Literature 1). For the purposes of achieving further broadbandization and higher speed beyond LTE, successor systems to LTE have been also studied a (for example, such a system is known as LTE advanced (LTE-A), Future Radio Access (FRA), and ($5^{th}$ Generation Mobile Communication System (5G), etc.)

In future radio communication systems (e.g., 5G), due to their use for mobile broadband, it is assumed that there will be a demand for further increases in speed and volume, while being required to reduce delay and deal with the connection of a large volume of devices. Furthermore, in order to achieve a further increase in speed and volume, it is also envisaged that an even broader bandwidth of the frequency spectrum will be utilized.

In order to meet this demand, it is expected in future radio communication systems to introduce a new radio access scheme (5G New Radio Access Technology (RAT)) in addition to the radio access scheme of a legacy LTE system (LTE RAT: Radio Access Technology).

CITATION LIST

Non-Patent Literature 1: 3GPP TS 36.300 Rel.8 "Evolved Universal Terrestrial Radio Access (E-UTRA) and Evolved Universal Terrestrial Radio Access Network (E-UTRAN); Overall description; Stage 2"

SUMMARY OF INVENTION

In accordance with one or more embodiments of the present invention, a user terminal used in a radio communication system in which downlink (DL) and uplink (UL) are switchable per transmission time interval (TTI) is disclosed. The user terminal includes a receiver that receives a DL signal in a DL TTI and a processor that controls reception of the DL signal by determining whether each TTI is the DL TTI or not based on a signal configuration of each TTI.

In some aspects, the processor determines whether each TTI is the DL TTI or not depending on whether a preamble is detected in the TTI or not.

In some aspects, a first symbol to which the preamble is allocated is different from a second symbol to which at least one of a downlink data channel and a downlink control channel is allocated, wherein the first symbol differs from the second symbol by at least one of: symbol length, a subcarrier spacing and a cyclic prefix (CP) length.

In some aspects, the preamble is specific to a cell, a transmission point, and a beam pattern.

In some aspects, the processor performs at least one of: a channel estimation and/or a correction of a time frequency offset by using the preamble.

In some aspects, wherein the processor determines that a given TTI provided from a radio base station is the DL TTI, irrespective of whether the preamble is detected in the TTI or not.

In some aspects, the user terminal also includes a transmitter that transmits a UL signal in a UL TTI. The processor controls transmission of the UL signal based on instruction information of UL transmission from a radio base station.

In some aspects, the processor stops determining whether a TTI of which the UL transmission is instructed by the instruction information is the DL TTI or not, or when the TTI of which the UL transmission is instructed by the instruction information is the DL TTI, the processor stops transmission of the UL signal.

In accordance with one or more embodiments of the present invention, a radio base station used in a radio communication system in which downlink (DL) and uplink (UL) are switchable per transmission time interval (TTI) is disclosed. The radio base station includes a processor that controls switching between a DL TTI and a UL TTI and a transmitter that transmits a DL signal in the DL TTI. The transmitter transmits the DL signal in the DL TTI by using a signal configuration that allows a user terminal to determine whether the TTI is the DL TTI or not.

In accordance with one or more embodiments of the present invention, a communication method in a radio communication system in which downlink (DL) and uplink (UL) are switchable per transmission time interval (TTI) is disclosed. The radio communication method includes a user terminal that receives a DL signal in a DL TTI and controls reception of the DL signal by determining whether each TTI is the DL TTI or not based on a signal configuration of each TTI.

DETAILED DESCRIPTION

In future radio communication systems, it is assumed that there will be a demand for increased usage efficiency of radio resources flexibly that are responsive to fluctuations in traffic between downlink (DL) and uplink (UL) and for reduction in delay. Accordingly, in the new radio access scheme (5G New RAT), it is required to switch between DL and UL in Time Division Duplex (TDD)—where DL and UL are time-division-multiplexed in the same frequency domain (i.e., carrier)—dynamically per transmission time interval (TTI).

However, when switching between DL and UL in TDD is allowed per TTI, the user terminal may not be able to determine whether each TTI is for DL or UL.

Embodiments of the invention are carried out in view of the foregoing and aim to provide a user terminal, a radio base station, and a radio communication method capable of determining whether each TTI is for DL or for UL appropriately in a radio communication system in which DL and UL are switchable per TTI in TDD.

In accordance with embodiments of the present invention, a user terminal used in a radio communication system in which downlink (DL) and uplink (UL) are switchable per transmission time interval (TTI), the user terminal comprising: a receiver that receives a DL signal in a DL TTI; and a processor that controls reception of the DL signal by determining whether each TTI is the DL TTI or not based on a signal configuration of each TTI.

According to embodiments of the present invention, it is possible to determine whether each TTI is for DL or for UL appropriately in a radio communication system in which DL and UL are switchable per TTI in TDD.

Figure 1A:
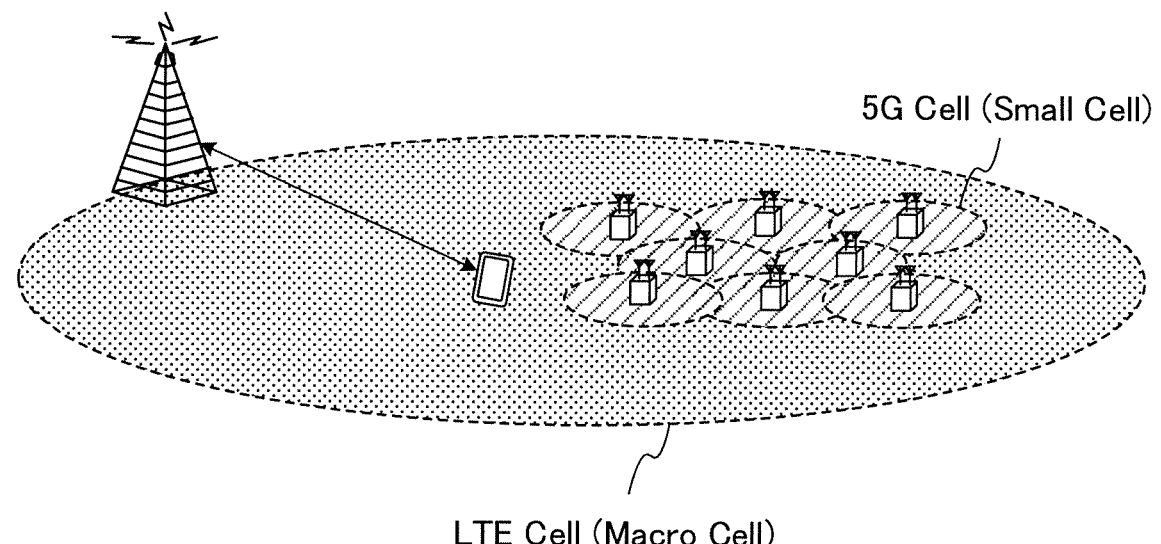
FIGS. 1A and 1B are diagrams illustrating an example of introduction of a future radio communication system.
Figure 1B:
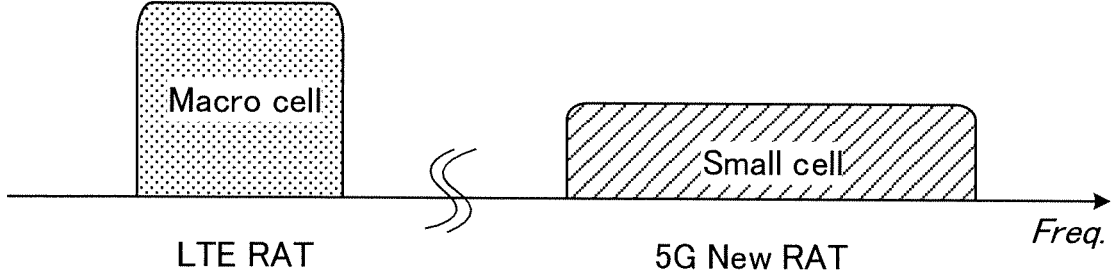

FIGS. 1A and 1B provide diagrams illustrating an example of introduction of a future radio communication system. As illustrated in FIG. 1A, the future radio communication system such as 5G is expected to be introduced as overlaying an existing LTE system.

For example, in FIG. 1A, a plurality of cells (5G cells) of a radio access scheme of the future radio communication system (5G New RAT) are located within a cell (LTE cell) of a radio access scheme of the existing LTE system (LTE RAT). As illustrated in FIG. 1A, it may be configured that the LTE cell is a macro cell having a relatively large coverage and the 5G is a small cell having a smaller coverage than the LTE cell.

In addition, as illustrated in FIG. 1B, 5G New RAT cell (for example, small cell) is expected to use a higher frequency band than the LTE RAT cell (for example, macro cell).

Figure 2A:
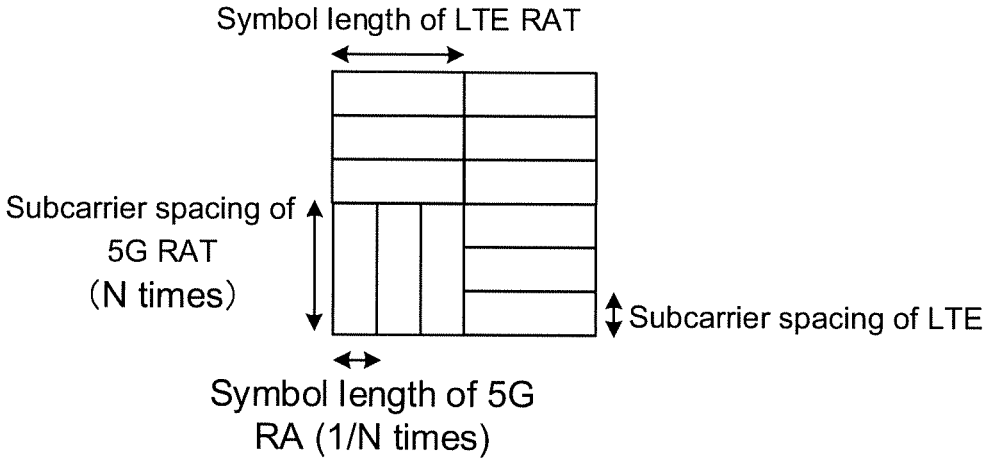
FIGS. 2A and 2B are diagrams illustrating an example of 5G New RAT.
Figure 2B:
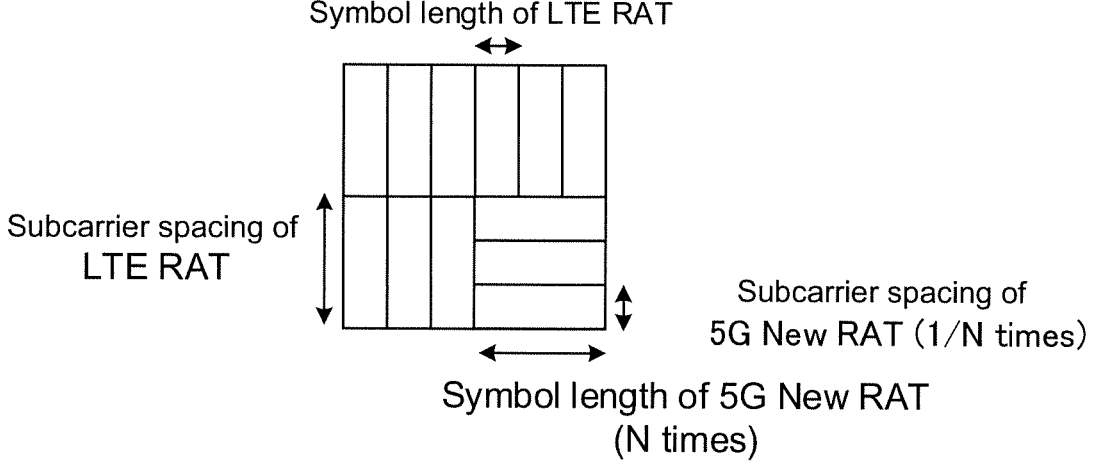

FIGS. 2A and 2B provide diagrams illustrating an example of 5G New RAT. As illustrated in FIG. 2A, in 5G New RAT, it is assumed that a frequency parameter (for example, subcarrier spacing, bandwidth, etc.) is N times as long as that of LTE RAT and the time parameter (for example, symbol length) is 1/N times as long as that of LTE RAT. In this case, the TTI consisting of a plurality of symbols becomes shorter than that of LTE RAT, 1 ms, which makes it possible to realize reduction in delay easily.

Otherwise, in 5G New RAT, it may be also assumed that the frequency parameter (for example, subcarrier spacing, bandwidth, etc.) is 1/N time greater than that of LTE RAT and the time parameter (for example, symbol length) is N time greater than that of LTE RAT. In this case, the symbol length becomes longer, which makes it possible to improve fading tolerance (be robust against fading).

In such 5G new RAT, there is a demand to improve the usage efficiency of radio resources flexibly that are responsive to fluctuations in traffic between DL and UL and provide lower delay. Therefore, in 5G New RAT, it is required in TDD to switch between DL and UL per TTI dynamically. In this case, it is a problem for a user terminal to determine whether each TTI is DL TTI or UL TTI instantaneously and to address switching between DL and UL per TTI.

For example, in TTI allocated to DL reception or UL transmission for a user terminal, the user terminal is able to recognize that TTI allocated for DL reception is DL TTI (TTI for DL) and TTI allocated for UL transmission is UL TTI (TTI for UL).

On the other hand, in TTI not allocated to DL reception or UL transmission for a user terminal, if switching between DL and UL is performed per TTI, the user terminal may not be able to recognize whether each TTI is DL TTI or UL TTI.

In TDD of the existing LTE system (Rel. 12eIMTA: enhanced Interference Mitigation & Traffic Adaptation), UL and DL subframes in DL/UL configuration (TDD DL/UL configuration) that indicates the configuration of DL and UL subframes in a radio frame are changed dynamically, that is, dynamic change between DL and UL per radio frame (10 ms) is allowed.

Figure 3:
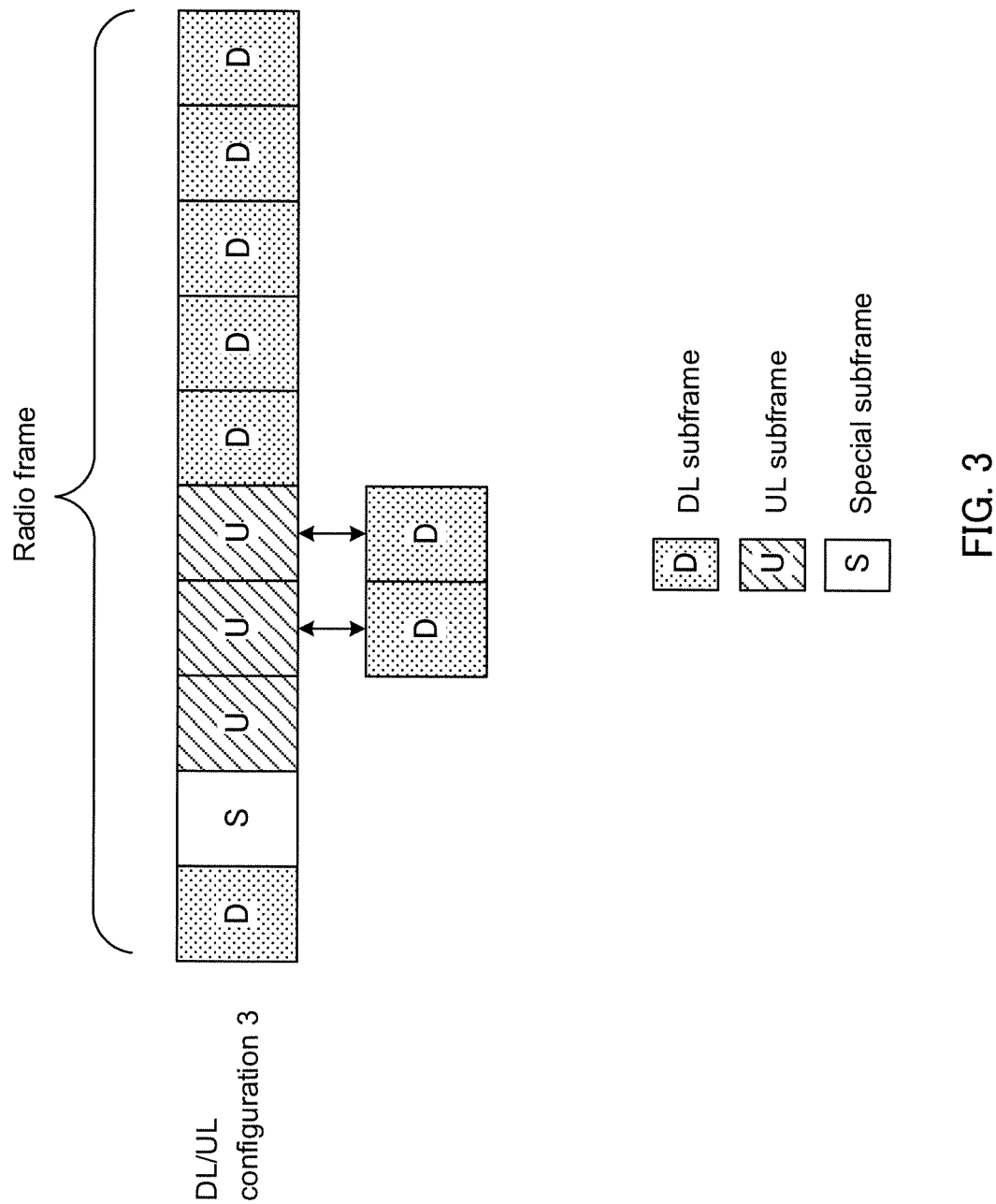
FIG. 3 is a diagram illustrating an example of enhanced Interference Mitigation & Traffic Adaptation (eIMTA)

FIG. 3 is a diagram illustrating an example of eIMTA. As illustrated in FIG. 3, in LTE TDD, DL/UL configuration (DL/UL configuration 3 in FIG. 3) is selected semi-statically from a plurality of predetermined DL/UL configurations. Even though FIG. 3 illustrates a particular DL/UL configuration, the present invention is not limited to that DL/UL configuration. In EIMTA, a part of UL subframes in the selected DL/UL configuration are dynamically changed to DL subframes, that change is provided to the user terminal per 10 ms by downlink control information (DCI).

Thus, when only a part of UL subframes in the DL/UL configuration are dynamically changed to DL subframes, a user terminal supporting eIMTA is able to recognize that the UL subframes are changed to DL subframes by the received DCI.

In addition, if only UL subframes in the DL/UL configuration are dynamically changed to DL subframes, it is possible to secure backward compatibility with a user terminal not supporting eIMTA. Specifically, in a UL subframe, the eIMTA-incompliant user terminal does not perform measurement of a DL channel state or the like and generally does not perform even UL transmission in the case of not allocating for UL transmission. Therefore, if a UL subframe is changed to a DL subframe, there is no influence on the eIMTA-unsupported user terminal.

On the other hand, in 5G RAT, there is no need to consider backward compatibility with eIMTA-unsupported user terminals like in eIMTA of the LTE system. Therefore, in 5G RAT, it is not necessary to put restriction on switching between DL and UL like in eIMTA, and it is assumed that DL and UL are switched more flexibly, that is, switching between DL and UL is performed dynamically per TTI.

However, if switching between DL and UL is allowed per TTI and the TTI is not allocated to DL reception or UL transmission, the user terminal may not be able to recognize whether each TTI is DL TTI or UL TTI.

Then, one or more embodiments of the present invention have found the user terminal is enabled to identify whether each TTI is DL TTI or UL TTI based on the signal configuration of DL TTI and UL TTI.

In accordance with embodiments of the present invention, a user terminal used in a radio communication system in which DL and UL are switchable per TTI receives a DL signal in DL TTI. The user terminal determines whether it is DL TTI or not based on the signal configuration of each TTI and controls reception of the DL signal.

The following description is made about a radio communication method according to one or more embodiments of the present invention.

First Embodiment

In a first embodiment in accordance with embodiments of the present invention, a description is made about the signal configuration for a user terminal to determine whether each TTI is DL TTI or not. DL TTI includes a preamble for a user terminal to determine whether the TTI is DL TTI or not. The user terminal determines whether the TTI is DL TTI or not based on presence or absence of a preamble in each TTI.

Here, the preamble is a sequence known to the radio base station and the user terminal and it may be specific to a cell (generated based on a cell ID), may be specific to a transmission point (generated based on a virtual ID), or may be specific to a beam pattern (generated based on identification information of a beam pattern). Alternatively, the preamble may be a kind of reference signal such as used in synchronization, cell recognition, reception signal power measurement, channel state information estimation, and so on.

Figure 4A:
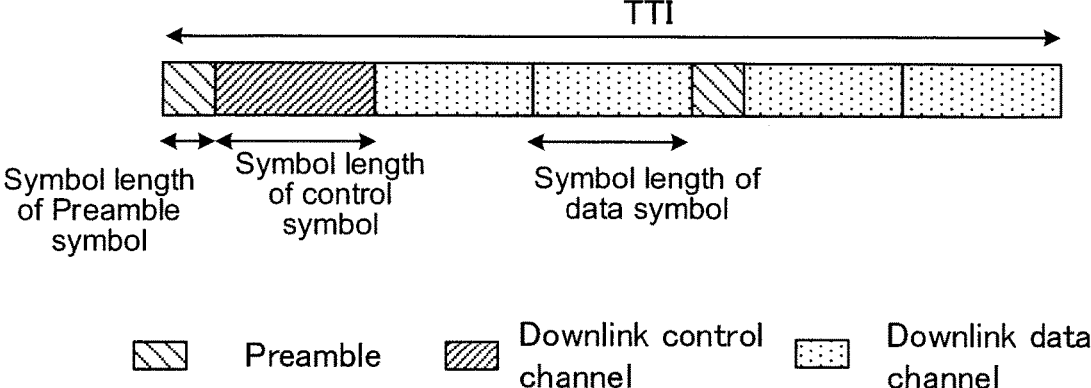
FIGS. 4A, 4B and 4C are diagrams illustrating an example of TTI for DL according to a first embodiment of the present invention.
Figure 4B:
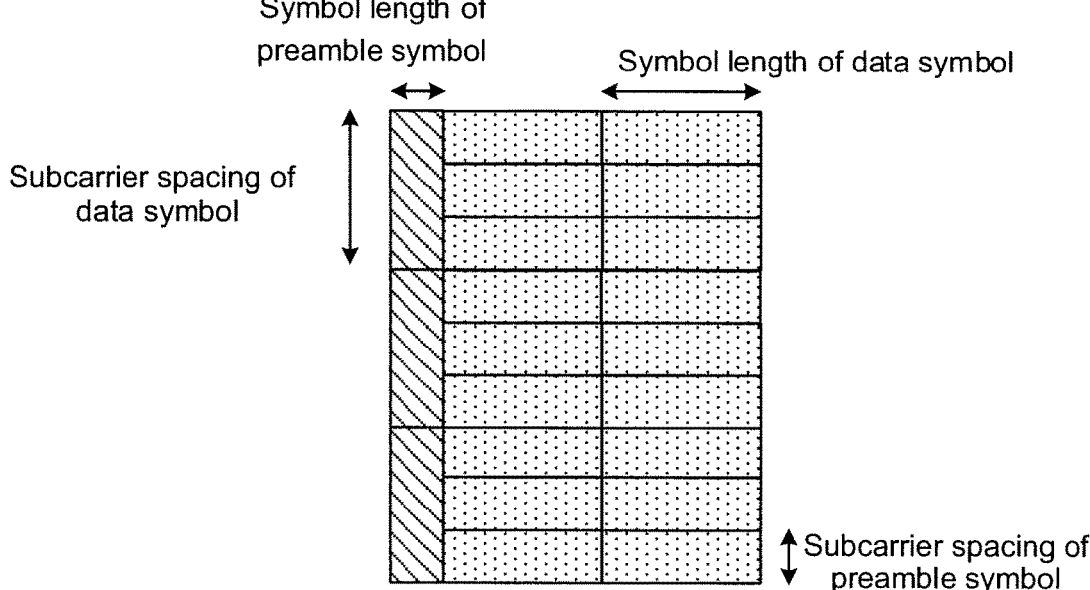
Figure 4C:
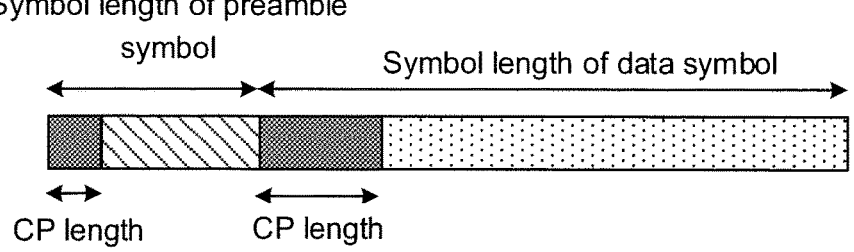

FIGS. 4A, 4B, and 4C provide diagrams illustrating an example of the configuration of DL TTI according to the first embodiment in accordance with embodiments of the present invention. As illustrated in FIG. 4A, DL TTI includes a symbol to which a preamble is allocated (preamble symbol), a symbol to which a downlink control channel is allocated (control symbol), and a symbol to which a downlink data channel is allocated.

Further, as illustrated in FIG. 4A, the preamble symbol is located at the beginning of TTI. Furthermore, a plurality of preamble symbols may be located to be distributed over TTI. For example, in FIG. 4A, the preamble symbol is located in the first symbol and the fifth symbol in TTI. Since the preamble symbol is located in the first symbol in TTI, the user terminal is able to determine whether the TTI is DL TTI or not promptly.

In addition, the preamble symbol in the TTI may be different in at least any of the symbol length, subcarrier spacing and cyclic prefix (CP) length from the data symbol and/or the control symbol.

For example, as illustrated in FIG. 4A, the symbol length of a preamble symbol may be shorter than the symbol lengths of a data symbol and a control symbol. Specifically, as illustrated in FIG. 4B, it may be configured that the subcarrier spacing of a preamble symbol is N times as long as the subcarrier spacing of a data symbol (and/or a control symbol) and the symbol length of a preamble symbol is 1/N times as long as the symbol length of a data symbol (N is a positive integer, here N=3). In this case, it becomes possible to shorten the time of detecting a preamble symbol and thereby to facilitate reduction of delay.

Further, though it is not shown, it may be configured that the subcarrier spacing of the preamble symbol is 1/N times (N is a positive integer) as long as that of the data symbol and/or control symbol, and the symbol length of the preamble symbol is N times as long as that of the data symbol. In this case, it becomes possible to improve the fading tolerance of the preamble symbol.

Furthermore, as illustrated in FIG. 4C, the CP length of the preamble symbol may be different from the CP length of the data symbol (and/or control symbol) and, for example, may be shorter.

Note that the user terminal uses the above-mentioned preamble symbol not only to determine whether the TTI is DL TTI or not, but perform other operations. For example, the user terminal may perform channel estimation and/or time frequency offset correction based on the preamble symbol. In this case, as illustrated in FIG. 4A, a plurality of preamble symbols are provided in DL TTI, thereby improving the channel estimation accuracy and improving the accuracy of correcting the time frequency offset.

Second Embodiment

In a second embodiment of the present invention, a description is made in detail about the operation of determining whether the TTI is a DL TTI or not in the user terminal.

Figure 5:
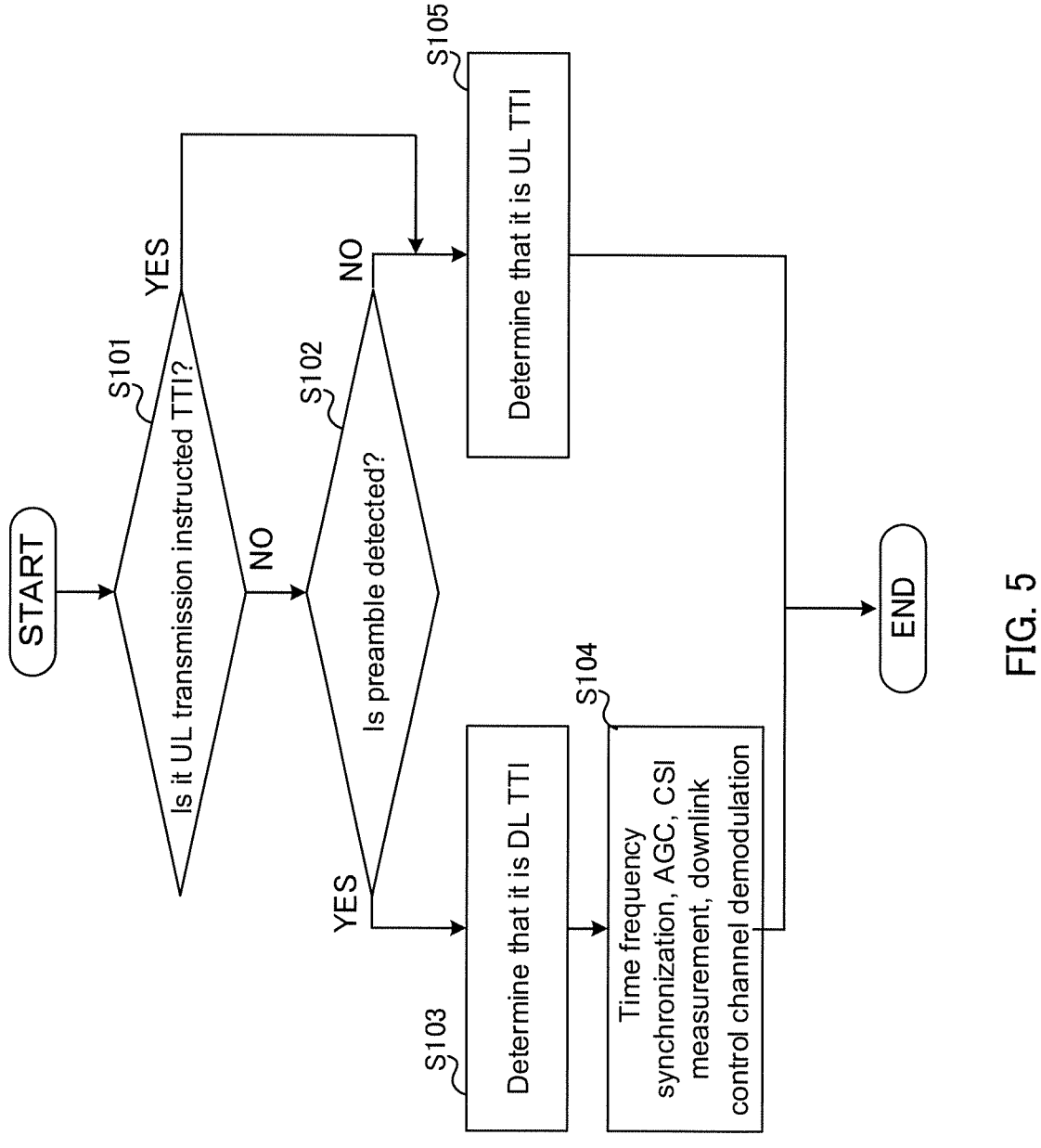
FIG. 5 is a flowchart illustrating an example of the operation of determining TTI according to a second embodiment of the present invention.

FIG. 5 is a flowchart showing an example of the operation of TTI determination (recognition) in a user terminal according to the second embodiment of the present invention. The user terminal performs the determination operation as illustrated in FIG. 5 per TTI. The operation of FIG. 5 is provided for illustrative purpose only and the determination operation of the user terminal is not limited to this.

As illustrated in FIG. 5, the user terminal determines whether TTI is UL transmission-instructed TTI or not based on instruction information from a radio base station (for example, UL rant) (step S101). When it is determined that the TTI is UL transmission-instructed TTI by the instruction information (step S101; YES), the user terminal omits the TTI determination operation of steps S102, S103, and S104. The user terminal then determines that the TTI is UL TTI (step S105) and performs UL transmission in the TTI.

On the other hand, if the TTI is not UL transmission-instructed TTI (step S101; NO), the user terminal determines whether the TTI includes a preamble or not (step S102). When the preamble is detected in the TTI (step S102; YES), the user terminal determines that the TTI is DL TTI (step S103). The user terminal is able to perform at least one of time frequency synchronization, AGC (Automatic Gain Control), channel estimation, and downlink control channel demodulation by using a reference signal included in the DL TTI (step S104).

On the other hand, when the preamble is not detected in the TTI (step S102; NO), the user terminal determines that the TTI is UL TTI (the TTI is not DL TTI) (step S105). In this case, the user terminal does not perform the operation that the user terminal performs when it is determined that the TTI is DL TTI (at least one of time frequency synchronization, AGC (Automatic Gain Control), channel estimation, and downlink control channel demodulation).

In FIG. 5, when the TTI is UL transmission-instructed TTI by transmission instruction information (for example, UL grant) from the radio base station (step S101; YES), the user terminal omits the operation of step S102 or later, but may not omit the operation. If a preamble is detected in TTI and it is determined that the TTI is DL TTI though the TTI is UL transmission-instructed TTI, the user terminal may stop (drop) the UL transmission.

Alternatively, when the user terminal is in a discontinuous reception (DRX) state, the user terminal may omit the above-mentioned TTI determination operation.

Further, the user terminal may omit the above-mentioned TTI determination operation for a Secondary cell (SCell) in a deactivated state.

Furthermore, the user terminal may omit the above-mentioned TTI determination operation based on resource information from the radio base station (network). Specifically, the user terminal receives resource information (for example, cycle, offset, etc.) that indicates a resource such that the above-mentioned TTI determination operation is omittable from the radio base station by higher layer signaling (for example, Radio Resource Control (RRC) signaling or broadcast information and omits the above-mentioned TTI determination operation based on the resource information.

For example, it is assumed that a long-term DL-dedicated TTI is configured and a synchronization signal and a cell recognition and/or measurement signal are transmitted. In this case, the radio base station transmits the resource information indicating a cycle and an offset of the DL-dedicated TTI to the user terminal. In the DL-dedicated TTI specified by the cycle and offset indicated by the resource information, the user terminal omits the above-mentioned TTI determination operation (irrespective of whether there is detected preamble or not), and determines that it is DL TTI.

As described up to this point, in accordance with one or more embodiments of the radio communication method from the present invention, the DL TTI includes a preamble symbol for a user terminal to determine whether the TTI is DL TTI or not. Therefore, even when switching between DL and UL is allowed per TTI, the user terminal is able to determine whether each TTI is DL TTI or not in accordance with the presence or absence of the preamble in the TTI.

Further, in accordance with one or more embodiments of the radio communication method from the present invention, the user terminal is able to determine whether each TTI is DL TTI or not by the signal configuration in the TTI (for example, presence or absence of a preamble), without blind decoding a downlink control channel to obtain DCI such as performed in the existing LTE system (eIMTA). This contributes to reduction of delay.

In accordance with one or more embodiments of the radio communication method from the present invention, the DL TTI length can be differentiated from the UL TTI length. For example, the UL TTI length may be 1/N times (N is a positive integer) as long as the DL TTI length. In addition, the DL TTI may include a symbol to transmit a feedback signal for a DL signal (for example, Hybrid Automatic Repeat reQuest-ACKnowledgement (HARQ-ACK)).

Radio Communication System

The following description concerns an example of the configuration of a radio communication system according to an embodiment of the present invention. In this radio communication system, a radio communication method is adopted to which the above-described examples are applied. Furthermore, each communication method can be applied independently, or in combination.

Figure 6:
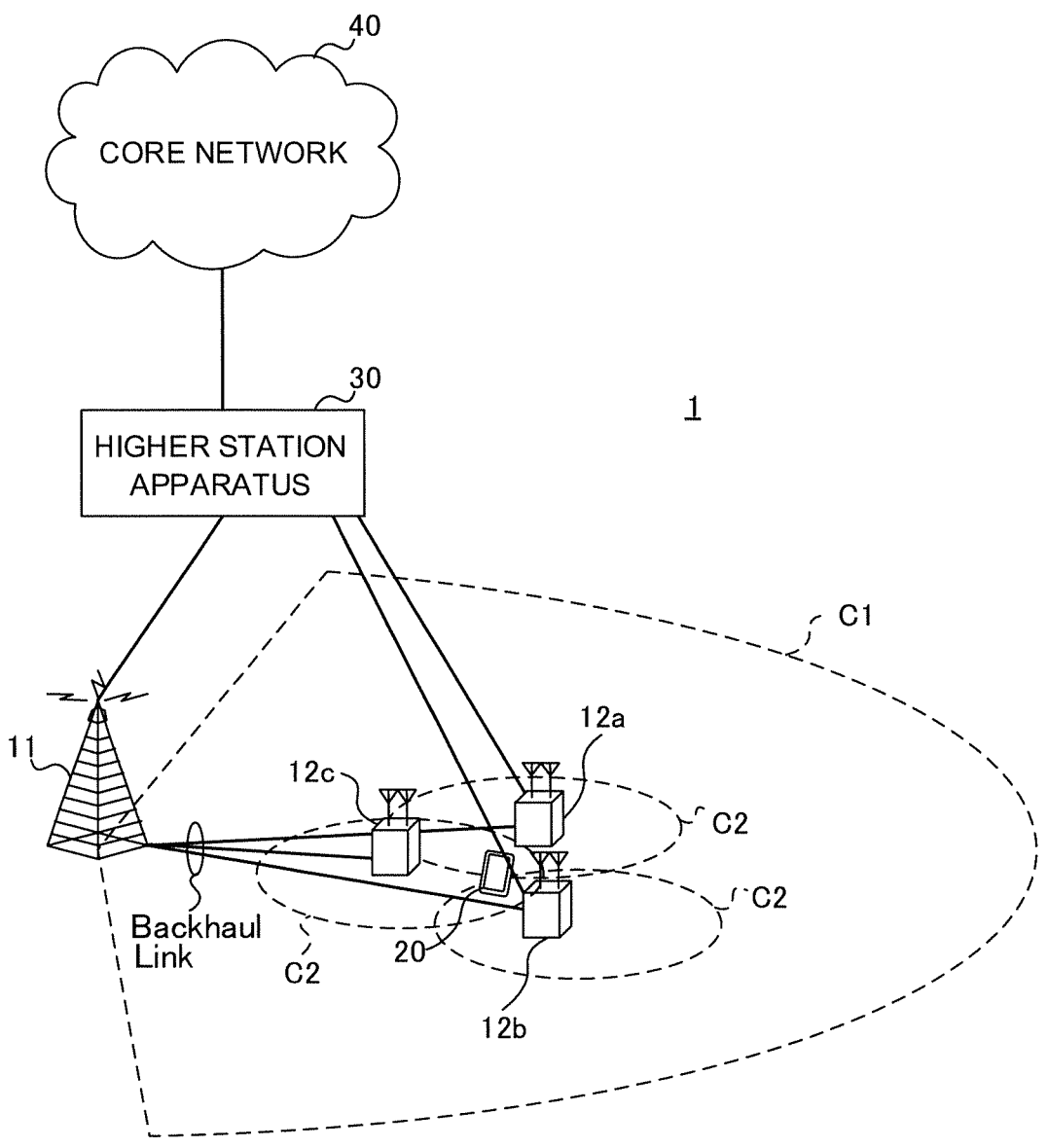
FIG. 6 is a diagram illustrating an example of a schematic configuration of a radio communication system of according to an embodiment of the present invention.

FIG. 6 shows an example of a schematic configuration of the radio communication system according to an embodiment of the present invention. The radio communication system 1 can apply carrier aggregation (CA) and/or dual connectivity (DC), in which a plurality of fundamental frequency blocks (component carriers) are aggregated, each component carrier as 1 unit being a system bandwidth of the LTE system (for example, 20 MHz). Note that this radio communication system may also be called SUPER 3G, LTE-A (LTE-Advanced), IMT-Advanced, 4G, 5G, FRA (Future Radio Access), etc. In addition, in the radio communication system 1, TDD is adopted and UL and DL are switchable per TTI.

The radio communication system 1 shown in FIG. 6 includes a radio base station 11 which forms a macro cell C1, and radio base stations 12a through 12c provided within the macro cell C1. Each radio base stations 12a through 12c forming a small cell C2 that is smaller than the macro cell C1. Furthermore, a user terminal 20 is provided within a nexus where the macro cell C1 and each small cell C2 overlap.

The user terminal 20 can connect both to the radio base station 11 and the radio base station 12. It is assumed that the user terminal 20 concurrently uses the macro cell C1 and the small cell C2 that use different frequencies via CA or DC. Furthermore, the user terminal 20 can apply CA or DC using a plurality of cells (Component Carriers (CCs)) (e.g., six or more CCs).

Communication between the user terminal 20 and the radio base station 11 can be carried out using a carrier (called an "existing carrier", "Legacy carrier", etc.) having a relative narrow bandwidth in a relatively low frequency band (e.g., 2 GHz). Whereas, communication between the user terminal 20 and the radio base station 12 may be carried out using a carrier having a relative wide bandwidth in a relative high frequency band (e.g., 3.5 GHz, 5 GHz, etc.), or using the same carrier as that with the radio base station 11. Note that the configuration of the frequency used by the radio base stations is not limited to the above.

A fixed-line connection (e.g., optical fiber, or X2 interface, etc., compliant with Common Public Radio Interface (CPRI)) or a wireless connection can be configured between the radio base station 11 and the radio base station 12 (or between two radio base stations 12).

The radio base station 11 and each radio base station 12 are connected to a higher station apparatus 30, which is in turn, connected to the core network 40. The higher station apparatus 30 includes, but is not limited to, an access gateway apparatus, a radio network controller (RNC), a mobility management entity (MME), etc. Furthermore, each radio base station 12 may be connected to the higher station apparatus 30 via the radio base station 11.

Note that the radio base station 11 is a radio base station having a relatively wide coverage, and may be called a macro base station, an aggregation node, eNodeB (eNB), or a transmission/reception point. Furthermore, the radio base station 12 is a radio base station having a local coverage, and may be called a small base station, a micro base station, a pico base station, a femto base station, Home eNodeB (HeNB), Remote Radio Head (RRH), a transmission/reception point, etc. Hereinafter, the radio base stations 11 and 12 will be generally referred to as "a radio base station 10" in the case where they are not distinguished from each other.

Each user terminal 20 is compatible with each kind of communication schemes such as LTE, LTE-A, etc., and also includes a fixed communication terminal in addition to a mobile communication terminal.

In the radio communication system 1, as radio access schemes are concerned, Orthogonal Frequency Division Multiple Access (OFDMA) is applied to the downlink (DL), and Single-Carrier Frequency Division Multiple Access (SC-FDMA) is applied to the uplink (UL). OFDMA is a multi-carrier transmission scheme for performing communication by dividing a frequency band into a plurality of narrower frequency bands (subcarriers) and mapping data to each subcarrier. SC-FDMA is a single carrier transmission scheme to reduce interference between terminals by dividing, per terminal, the system bandwidth into bands formed with one or more continuous resource blocks, and allowing a plurality of terminals to use mutually different bands. The DL and UL radio access schemes are not limited to this combination and OFDMA may be applied to UL. Otherwise, non-orthogonal multiple access (NOMA) (also called "power multiple access") can also be utilized.

In the radio communication system 1, there are several options for downlink channels to be used such as a downlink data channel (Physical Downlink Shared Channel (PDSCH)) that is shared by each user terminal 20, a broadcast channel (Physical Broadcast channel (PBCH)), an L1/L2 control channel (L1/L2 control signal), etc. PDSCH is used to transmit user data, higher layer control information, and an System Information Block (SIB). Furthermore, PBCH is used to an Master Information Block (MIB), etc.

The downlink L1/L2 control channel includes a downlink control channel (Physical Downlink Control Channel (PDCCH), an Enhanced Physical Downlink Control Channel (EPDCCH)), a Physical Control Format Indicator Channel (PCFICH), a Physical Hybrid-ARQ Indicator Channel (PHICH), etc. PDCCH is used to transmit downlink control information (DCI), etc., which includes PDSCH and Physical Uplink Shared Channel (PUSCH) scheduling information. PCFICH is used to transmit the number of OFDM symbols used in the PDCCH. PHICH is used to transmit a HARQ delivery acknowledgement signal (ACK/NACK) for the PUSCH. An EPDCCH that is frequency-division-multiplexed with a PDSCH (downlink shared data channel) can be used for transmitting the DCI in the same manner as the PDCCH.

In the radio communication system 1, there are several options for uplink channels such as an uplink shared channel (Physical Uplink Shared Channel (PUSCH)) that is shared by each user terminal 20, an uplink control channel (Physical Uplink Control Channel (PUCCH)), and a random access channel (Physical Random Access Channel (PRACH)), etc. The PUSCH is used to transmit user data and higher layer control information. Uplink control information (UCI) including at least one of delivery acknowledgement information (HARQ-ACK) and radio quality information (CQI), etc., is transmitted via the PUSCH or the PUCCH. A random access preamble for establishing a connection with a cell is transmitted by the PRACH.

Radio Base Station

Figure 7:
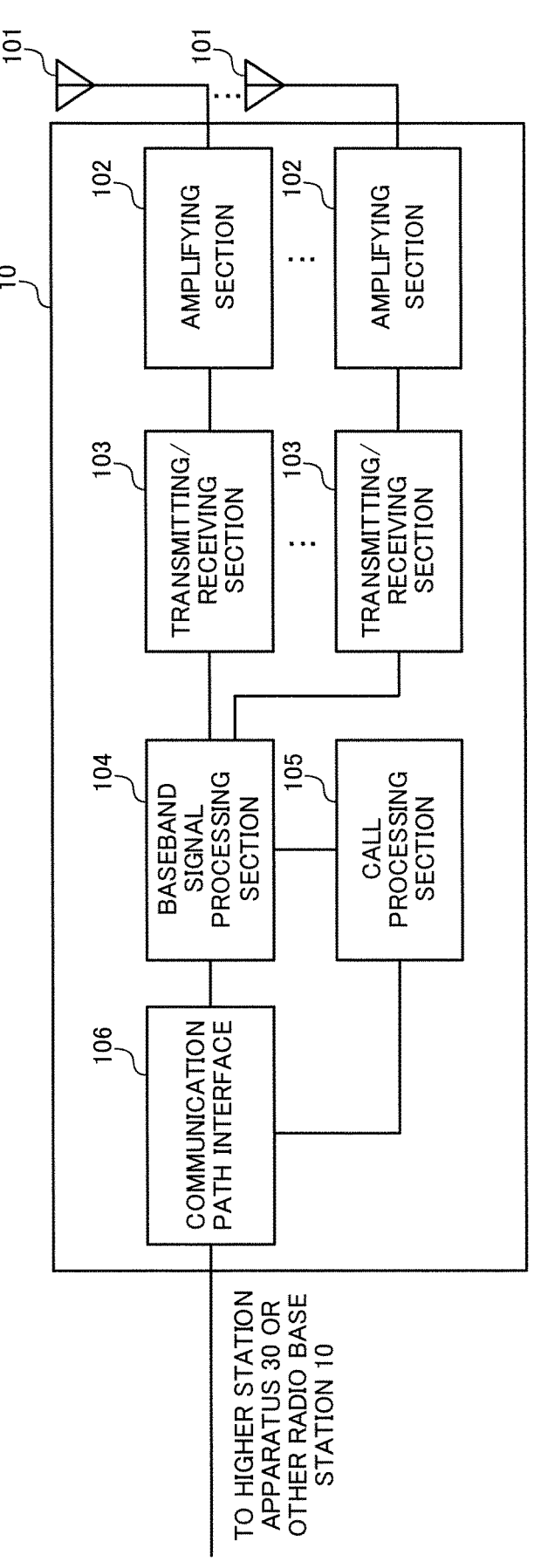
FIG. 7 is a diagram illustrating an overall configuration of a radio base station in accordance with embodiments of the present invention.

FIG. 7 is a diagram illustrating an overall configuration of the radio base station in accordance to one or more embodiments of the present invention. The radio base station 10 is includes a plurality of transmission/reception antennas 101, amplifying sections 102, transmitting/receiving sections 103, a baseband signal processing section 104, a call processing section 105, and a transmission path interface 106. Note that there may be duplicate transmission/reception antennas 101, amplifying sections 102, and transmitting/receiving sections 103.

User data that is to be transmitted on the downlink from the radio base station 10 to the user terminal 20 is input from the higher station apparatus 30, via the transmission path interface 106, into the baseband signal processing section 104.

In the baseband signal processing section 104, in regard to the user data, signals are subjected to Packet Data Convergence Protocol (PDCP) layer processing, Radio Link Control (RLC) layer transmission processing such as division and coupling of user data and RLC retransmission control transmission processing, Medium Access Control (MAC) retransmission control (e.g., Hybrid Automatic Repeat reQuest (HARQ) transmission processing), scheduling, transport format selection, channel coding, inverse fast Fourier transform (IFFT) processing, and precoding processing, and resultant signals are transferred to the transmission/reception sections 103. Furthermore, with respect to downlink control signals, transmission processing is performed by channel coding and inverse fast Fourier transform, and resultant signals are also transferred to the transmission/reception sections 103.

Each transmitting/receiving section 103 converts the baseband signals, after being precoded for each antenna, to a radio frequency band and transmits this radio frequency band. The radio frequency signals that are subject to frequency conversion by the transmitting/receiving sections 103 are amplified by the amplifying sections 102, and are transmitted from the transmission/reception antennas 101.

The transmitting/receiving sections 103 may transmit information (for example, UL grant or DL assignment) that indicates UL transmission to the user terminal 20 or DL reception from a downlink control channel. Furthermore, the transmitting/receiving sections 103 may transmit, by higher layer signaling, resource information (for example, cycle, offset, etc.) that indicates a TTI determination omittable resource.

Based on common recognition in the field of the art pertaining to embodiments of the present invention, each transmitting/receiving section 103 can correspond to a transmitter/receiver, a transmitter/receiver circuit, or a transmitter/receiver device. Note that each transmitting/receiving section 103 may be configured as an integral transmitting/receiving section or can be configured as two separate sections (a transmitting section and a receiving section).

Whereas, with regard to the uplink signals, radio frequency signals received by each transmission/reception antenna 101 are amplified by each amplifying section 102. The transmitting/receiving sections 103 receive the uplink signals that are amplified from the corresponding amplifying sections 102. The transmitting/receiving sections 103 frequency-convert the received signals into baseband signals and the converted signals are then output to the baseband signal processing section 104.

The baseband signal processing section 104 performs Fast Fourier Transform (FFT) processing, Inverse Discrete Fourier Transform (IDFT) processing, error correction decoding, MAC retransmission control reception processing, and RLC layer and PDCP layer reception processing on user data included in the input uplink signals. The signals are then transferred to the higher station apparatus 30 via the transmission path interface 106. The call processing section 105 performs call processing such as setting up and releasing a communication channel, manages the state of the radio base station 10, and manages the radio resources.

The transmission path interface 106 performs transmission and reception of signals with the higher station apparatus 30 via a predetermined interface. Furthermore, the transmission path interface 106 can perform transmission and reception of signals (backhaul signaling) with a neighboring radio base station 10 via an inter-base-station interface (for example, optical fiber or X2 interface compliant with Common Public Radio Interface (CPRI)).

Figure 8:
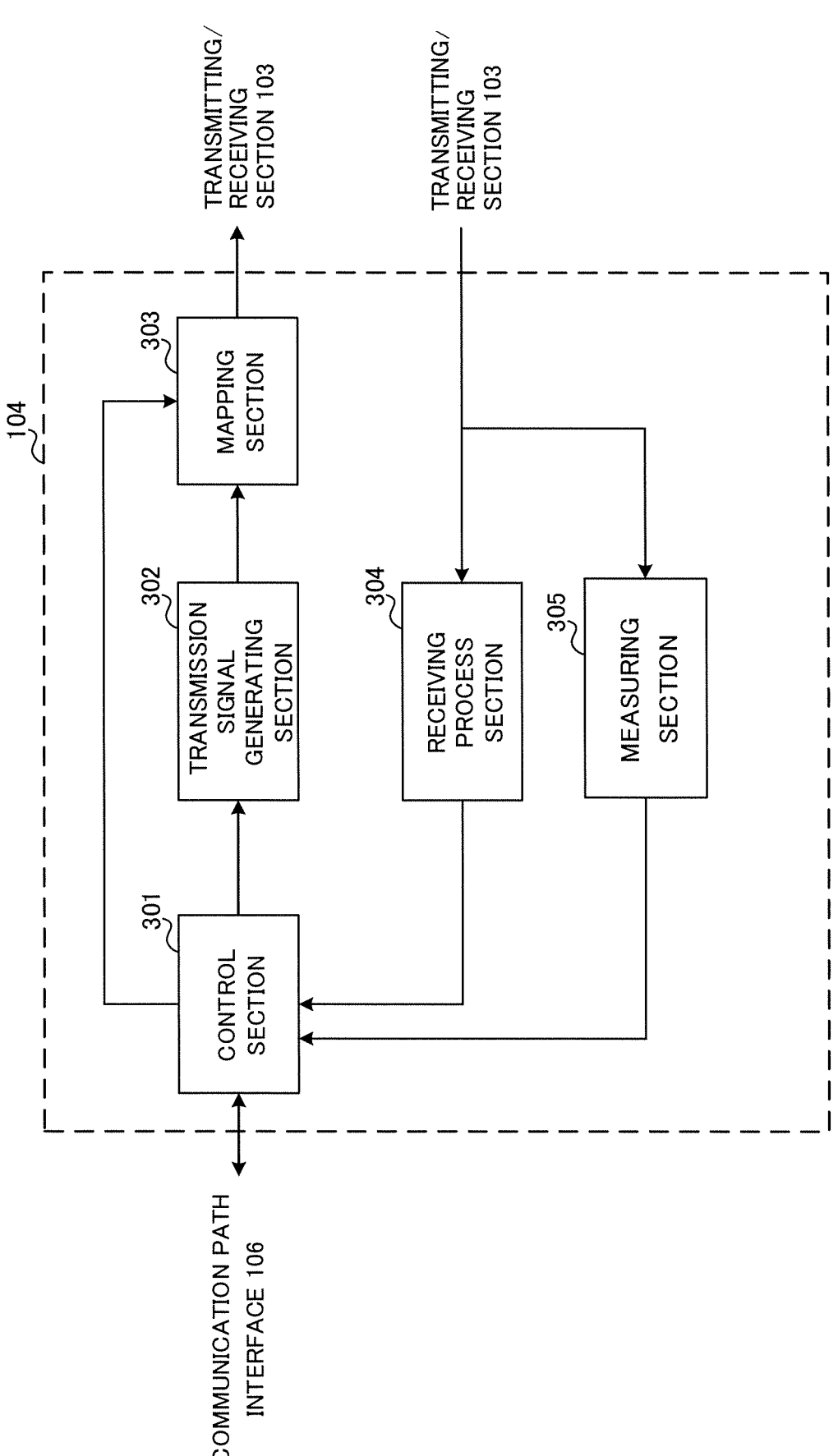
FIG. 8 is a diagram illustrating a functional configuration of the radio base station in accordance with embodiments of the present invention.

FIG. 8 is a diagram illustrating the functional configurations of the radio base station in accordance with one or more embodiments of the present invention. Note that although FIG. 8 mainly shows functional blocks of the features of one or more embodiments of the present invention, the radio base station 10 is also provided with other functional blocks that are necessary for carrying out radio communication that are not shown. As illustrated in FIG. 8, the baseband signal processing section 104 includes at least a control section 301, a transmission signal generating section 302, a mapping section 303, a reception signal processing section 304, and a measuring section 305.

The control section 301 performs the control of the entire radio base station 10. The control section 301 controls, for example, the generation of the downlink signals via the transmission signal generating section 302, the mapping of signals via the mapping section 303, and the receiving process of signals via the reception signal processing section 304.

Specifically, the control section 301 controls switching between DL TTI and UL TTI. For example, the control section 301 may switch between DL TTI and UL TTI per TTI based on the traffic of DL and/or UL.

In addition, the control section 301 controls the transmission signal generating section 302 and the mapping section 303 to include a preamble symbol for a preamble in DL TTI. Further, the control section 301 may adjust the control to include a plurality of preamble symbols in DL TTI.

Further, the control section 301 may control the transmission signal generating section 302 and the mapping section 302 to make the preamble symbol different from a symbol to which the data channel and/or control channel is allocated. This difference can be at least one of the following: the symbol length, subcarrier spacing, or CP length (FIG. 4).

Furthermore, the control section 301 controls allocation of radio resources to the downlink data channel and the uplink data channel (scheduling). The control section 301 may control the downlink control channel transmission, the instruction information to instruct UL transmission, or DL reception in the allocated radio resource.

Furthermore, the control section 301 may determine a TTI determination omittable resource (for example, long-term DL-dedicated TTI) and transmit resource information to instruct the resource (for example, cycle, offset, and so on) by higher layer signaling.

Based on common recognition in the field of the art pertaining to the present invention, the control section 301 can correspond to a controller, a control circuit, or a control device. As would be understood by a person of ordinary skill in the art, the control section may be any type of device capable of performing the processing function, for example, a processor.

The transmission signal generating section 302 generates a DL signal (including downlink data channel, downlink control channel (L1 control signal), downlink reference signal) based on instructions from the control section 301, and outputs the generated signal to the mapping section 303.

Specifically, the transmission signal generating section 302 generates a preamble to be mapped to a preamble symbol, based on the instruction from the control section 301 and outputs the preamble to the mapping section 303. Here, the preamble is a sequence already known to the user terminal 20 and the radio base station 10 and may be either cell-specific, transmission point-specific, or beam pattern-specific sequence.

For example, the transmission signal generating section 302 may generate a preamble based on either the cell ID, virtual cell ID, or beam pattern identification information. Note that information to use in generation of the preamble (for example, cell ID, virtual cell ID, or beam pattern identification information) may be provided to the user terminal 20 by higher layer signaling.

Based on common recognition in the field of the art pertaining to the present invention, the transmission signal generating section 302 can correspond to a signal generator, a signal generating circuit, or a signal generating device.

Based on instructions from the control section 301, the mapping section 303 maps the DL signal generated in the transmission signal generating section 302 to predetermined radio resources to output to the transmitting/receiving sections 103.

Specifically, based on the instructions from the control section 301, the mapping section 303 maps the DL signal generated in the transmission signal generating section 302 to a preamble symbol and outputs it to the transmitting/receiving sections 103.

Based on common recognition in the field of the art pertaining to the present invention, the mapping section 303 can correspond to a mapper, a mapping circuit, and a mapping device.

The reception signal processing section 304 performs a receiving process (e.g., demapping, demodulation, and decoding, etc.) on the UL signal (including an uplink data channel, an uplink control channel, and an uplink reference signal) transmitted from the user terminal 20. The result of this process is output to the control section 301.

Based on common recognition in the field of the art pertaining to the present invention, the reception signal processing section 304 can correspond to a signal processor, a signal processing circuit, or a signal processing device. Alternatively, the reception signal processing section 304 can be configured as a measurer, a measuring circuit, or a measuring device.

The measuring section 305 performs measurement using an uplink reference signal from the user terminal 20 and outputs a measurement result to the control section 301. Based on common recognition in the field of the art pertaining to the present invention, the measuring section 305 can correspond to a signal processor, a signal processing circuit, or a signal processing device. Alternatively, the measuring section 305 can be configured as a measurer, a measuring circuit, or a measuring device.

User Terminal

Figure 9:
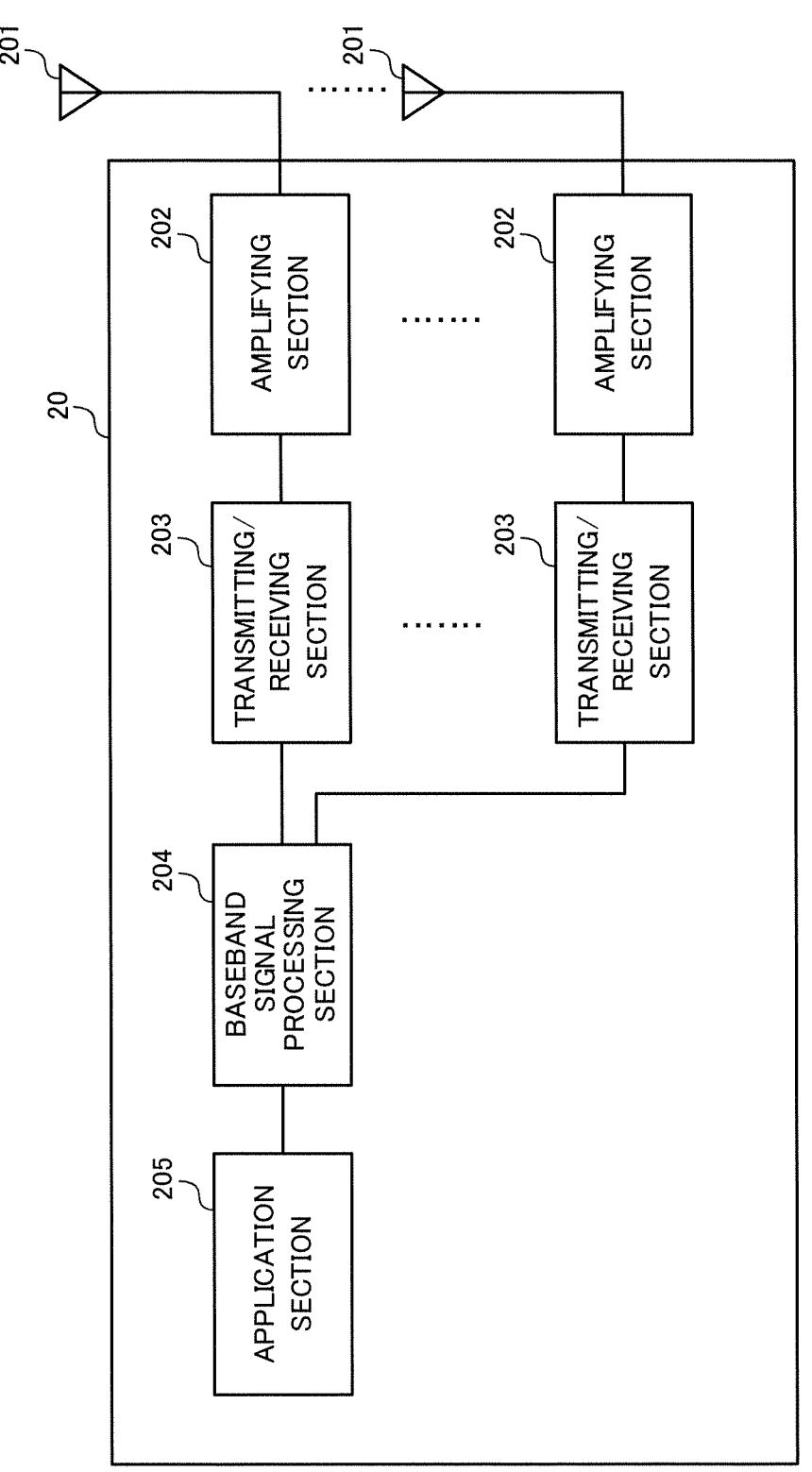
FIG. 9 is a diagram illustrating an overall configuration of a user terminal in accordance with embodiments of the present invention.

FIG. 9 is a diagram showing an overall structure of a user terminal in accordance with one or more embodiments of the present invention. The user terminal 20 is provided with a plurality of transmitting/receiving antennas 201 for Multiple Inputs/Multiple Outputs (MIMO) communication. The user terminal 20 is also provided with amplifying sections 202, transmitting/receiving sections 203, a baseband signal processing section 204, and an application section 205.

Radio frequency signals that are received in the plurality of transmitting/receiving antennas 201 are amplified in the corresponding amplifying sections 202. Each transmitting/receiving section 203 receives a downlink signal that has been amplified by an associated amplifying section 202. The transmitting/receiving sections 203 perform frequency conversion on the reception signals to convert into baseband signals, which are then output to the baseband signal processing section 204.

The baseband signal is subjected to an FFT process, error correction decoding, a retransmission control receiving process, etc., in the baseband signal processing section 204. The downlink user data is forwarded to the application section 205. The application section 205 performs processes related to higher layers above the physical layer and the MAC layer. Furthermore, out of the downlink data, broadcast information is also forwarded to the application section 205.

On the other hand, uplink user data is input to the baseband signal processing section 204 from the application section 205. In the baseband signal processing section 204, a retransmission control transmission process (e.g., a HARQ transmission process), channel coding, precoding, a discrete fourier transform (DFT) process, an inverse fast fourier transform (IFFT) process, etc., are performed, and the result is forwarded to each transmitting/receiving section 203. The baseband signal that is output from the baseband signal processing section 204 is converted into a radio frequency band in the transmitting/receiving sections 203. Then, the amplifying sections 202 amplify the radio frequency signal having been subjected to frequency conversion, and transmit the resulting signal from the transmitting/receiving antennas 201.

Note that the transmitting/receiving sections 203 receives, in the downlink control channel, instruction information to instruct UL transmission for the user terminal 20 or DL reception (for example, UL grant or DL assignment). In addition, the transmitting/receiving sections 203 may receive resource information to indicate TTI determination omittable resource (for example, cycle, offset, etc.)

Based on common recognition in the field of the art pertaining to the present invention, each transmitting/receiving section 203 can correspond to a transmitter/receiver, a transmitter/receiver circuit or a transmitter/receiver device. Furthermore, each transmitting/receiving section 203 may be configured of an integral transmitting/receiving section, or configured as two separate sections (a transmitting section and a receiving section).

Figure 10:
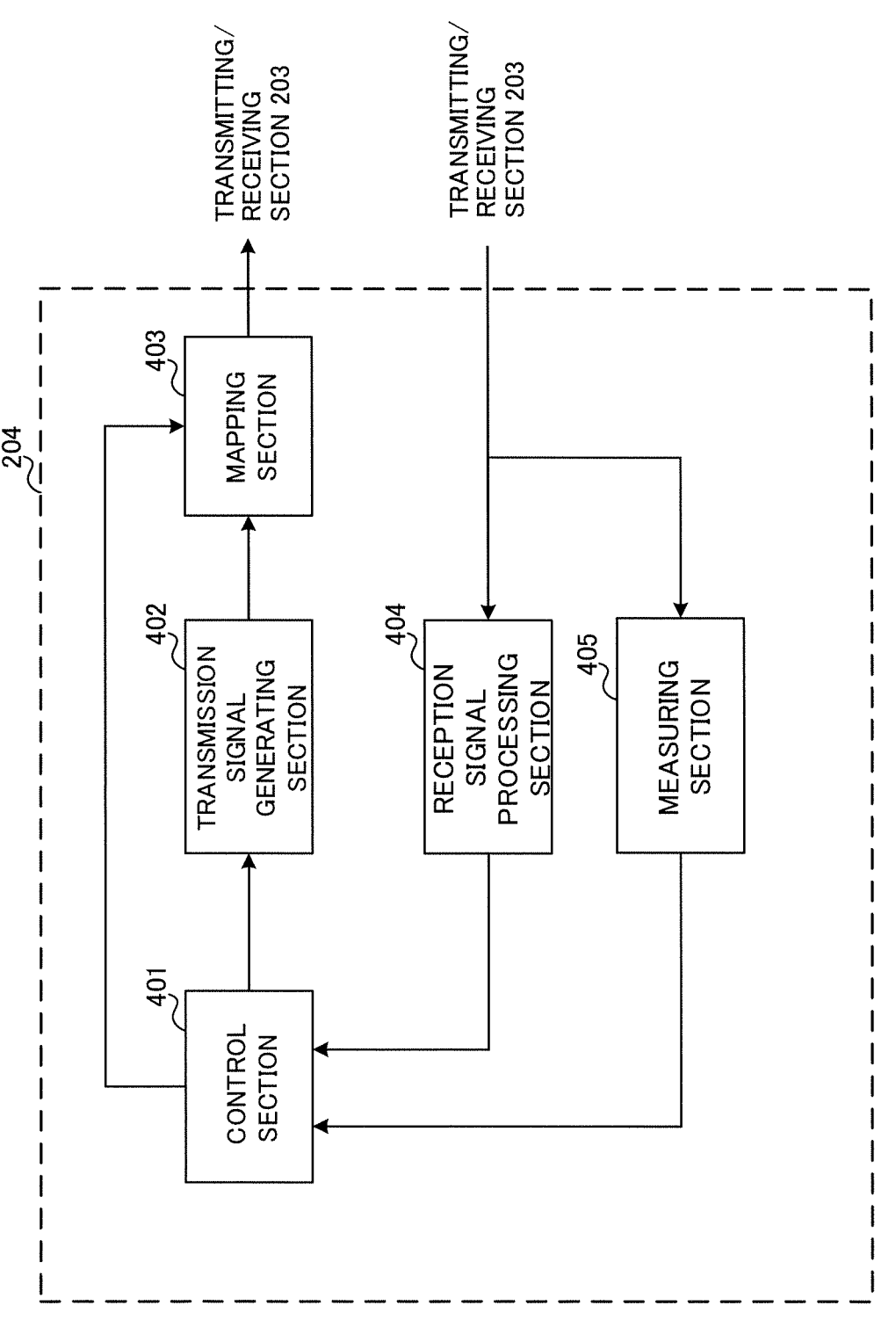
FIG. 10 is a diagram illustrating a functional configuration of the user terminal in accordance with embodiments of the present invention.

FIG. 10 is a diagram illustrating the functional configurations of the user terminal in accordance with one or more embodiments of the present invention. Note that FIG. 10 mainly shows functional blocks of the features of one or more embodiments of the present invention, and the user terminal 20 is also provided with other functional blocks that are necessary for carrying out radio communication that are not shown. As illustrated in FIG. 10, the baseband signal processing section 204 provided in the user terminal 20 includes a control section 401, a transmission signal generating section 402, a mapping section 403, a reception signal processing section 404, and a measuring section 405.

The control section 401 carries out the control of the entire user terminal 20. The control section 401 controls, e.g., the signal generation performed by the transmission signal generating section 402, the signal mapping performed by the mapping section 403, and the signal reception processes performed by the reception signal processing section 404.

In addition, the control section 401 determines whether each TTI is DL TTI (TTI for DL) or not based on the signal configuration of the TTI and controls reception of a DL signal. Additionally, the control section 401 may determine whether the TTI is DL TTI or not in accordance with the presence or absence of a preamble detected in each TTI.

For example, when the preamble is detected in TTI, the control section may determine that TTI is DL TTI. In this case, the control section 401 may perform at least one of the following processes: time frequency synchronization, AGC (Automatic Gain Control), channel estimation, or demodulation of a downlink control channel by using a reference signal included in the DL TTI.

Or, when the preamble is not detected in TTI, the control section 401 may determine that the TTI is UL TTI. In this case, the control section 401 may not perform the above-mentioned processes that are performed when it is determined that the TTI is DL TTI.

Further, regarding a given TTI provided from the radio base station 10 (for example, a long-term DL TTI), the control section 401 may determine that the TTI is DL TTI, irrespective of whether there is a preamble detected in the TTI. Note that the given TTI may be determined based on resource information (for example, cycle, offset, etc.) provided from the radio base station by higher layer signaling.

Furthermore, the control section 401 may control UL signal transmission based on instruction information (for example, UL grant) of the UL transmission from the radio base station 10. Specifically, regarding the TTI instructed to use in UL transmission by the instruction information, the control section 401 may stop determining whether the TTI is DL TTI or not. Alternatively, the control section 401 may determine, in TTI instructed to use for UL transmission by the above-mentioned instruction information, whether the TTI is DL TTI or not, and when it is determined that the TTI is DL TTI, the control section 401 may stop transmission of the UL signal.

Furthermore, the control section 401 may control the measuring section 405 to perform channel estimation by using a preamble in TTI. The control section 401 may perform correction of the time frequency offset by using the preamble in the TTI.

Based on common recognition in the field of the art pertaining to the present invention, the control section 401 can correspond to a controller, a control circuit or a control device. As would be understood by a person skilled in the art, the control section 401 may be any type of device capable of performing a processing function, for example, a processor.

The transmission signal generating section 402 generates UL signals (including an uplink data signal, an uplink control signal, an uplink reference signal, etc.) based on instructions from the control section 401, and outputs these UL signals to the mapping section 403. For example, the transmission signal generating section 402 generates an uplink control signal (PUCCH) including a UCI. In addition, the transmission signal generating section 402 generates an uplink data channel including uplink user data.

Based on common recognition in the field of the art pertaining to the present invention, the transmission signal generating section 402 can correspond to a signal generator, a signal generating circuit, or a signal generating device.

The mapping section 403 maps the UL signal (uplink control signal, uplink data signal, uplink reference signal, etc.) generated by the transmission signal generating section 402, based on instructions from the control section 401, to radio resources and outputs the generated signal to the transmitting/receiving sections 203. Based on common recognition in the field of the art pertaining to the present invention, the mapping section 403 can correspond to a mapper, a mapping circuit, or a mapping device.

The reception signal processing section 404 performs reception processing (e.g., demapping, demodulation, decoding, etc.) on the DL signal (including a downlink control channel (UL control signal) and a downlink data channel). The reception signal processing section 404 outputs the information received from the radio base station 10 to the control section 401. The reception signal processing section 404 outputs (for example, broadcast information, system information, control information by higher layer signaling such as RRC signaling, DCI, etc.) to the control section 401.

Based on common recognition in the field of the art pertaining to the present invention, the reception signal processing section 404 can correspond to a signal processor, a signal processing circuit, or a signal processing device. Furthermore, the reception signal processing section 404 can be configured as a receiving section pertaining to the present invention. As would be understood by a person skilled in the art, the receiving section may be any type of device capable of performing the receiving function, for example, a receiver.

The measuring section 405 measures (estimates) a channel state based on a downlink reference signal (for example, CRS or CSI-RS) from the radio base station 10 and outputs a measurement result to the control section 401. The measuring section 405 may estimate the channel state based on a preamble allocated to a preamble symbol in the TTI.

Based on common recognition in the field of the art pertaining to the present invention, the measuring section 405 can correspond to a signal processor, a signal processing circuit, or a signal processing device. The measuring section 405 can also be configured as a measurer, a measuring circuit or a measuring device.

Furthermore, the block diagrams used in the above description of the present embodiment indicate function-based blocks. These functional blocks (configured sections) are implemented via a combination of hardware and software. Furthermore, the implementation of each functional block is not limited to a particular means. In other words, each functional block may be implemented by a single device that is physically connected, or implemented by two or more separate devices connected by a fixed line or wirelessly connected.

For example, some or all of the functions of the radio base station 10 and the user terminal 20 may be implemented by using hardware such as ASICs (Application Specific Integrated Circuits), PLDs (Programmable Logic Devices), FPGAs (Field Programmable Gate Arrays), etc. Furthermore, the radio base station 10 and the user terminal 20 may be each implemented by a computer device that includes a processor (CPU: Central Processing Unit), a communication interface for connecting to a network, a memory and a computer-readable storage medium that stores a program(s). In other words, the radio base station and the user terminal, pertaining to one or more embodiments of the present invention may function as a computer that performs processes of the radio communication method pertaining to the present invention.

The processor and memory, etc., are connected to buses for communication of information. Furthermore, the computer-readable storage medium includes, e.g., a flexible disk, a magnetic-optical disk, Read Only Memory (ROM), Erasable Programmable ROM (EPROM), Compact Disc-ROM (CD-ROM), Random Access Memory (RAM), a hard disk, etc. Furthermore, a program may be transmitted from a network via electric telecommunication lines. Furthermore, the radio base station 10 and the user terminal 20 may also include an input device such as input keys, and an output device such as a display.

The functional configurations of the radio base station 10 and the user terminal 20 may be implemented using the above-mentioned hardware, may be implemented using software modules that are run by a processor, or may be implemented using a combination of both. The processor controls the entire user terminal by operating an operating system. Furthermore, the processor reads programs, software modules, and data from the storage medium. The processor also performs the various processes.

The above-mentioned program only needs to be a program that can perform the operations described in one or more embodiments of the present invention on a computer. For example, the control section 401 of the user terminal 20 may be stored in the memory, and implemented by the processor operating a control program. The other above-mentioned functional blocks can also be implemented in the same manner.

Furthermore, software and commands, etc., may be transmitted/received via a transmission medium. For example, in the case where software is transmitted from a website, server or other remote source by using fixed-line technology, such as coaxial cable, optical fiber cable, twisted-pair wire and digital subscriber's line (DSL), etc., and/or wireless technology, such as infrared, radio and microwaves, etc., such fixed-line technology and wireless technology are included within the definition of a transmission medium.

Note that technical terms discussed in the present specification and/or technical terms necessary for understanding the present specification may be replaced with technical terms having the same or similar meaning. For example, channel and/or symbol may be signals (signaling). Furthermore, a signal may be a message. Furthermore, component carrier (CC) may be called a carrier frequency, cell, etc.

Furthermore, information and parameters, etc., discussed in the present specification may be expressed as absolute values, as a relative value with respect to a predetermined value, or expressed as other corresponding information. For example, a radio resource may be indicated as an index.

Information and signals, etc., discussed in the present specification may be expressed using any one of various different technologies. For example, data, instructions, commands, information, signals, bits, symbols, chips, etc., that could be referred to throughout the above description may be expressed as voltage, current, electromagnetic waves, a magnetic field or magnetic particles, optical field or photons, or a desired combination.

The above-described embodiments of the present invention may be used independently, used in combination, or may be switched in real-time while being implemented. Furthermore, notification of predetermined information (e.g., notification of "is X") does not need to be explicit, but may be implicitly (e.g., by not notifying the predetermined information) carried out.

Notification of information is not limited to the embodiments of the present invention, such notification may be carried out via a different method. For example, notification of information may be implemented by physical layer signaling (e.g., Downlink Control Information (DCI) or Uplink Control Information (UCI)), higher layer signaling (e.g., Radio Resource Control (RRC) signaling, Medium Access Control (MAC) signaling, or broadcast information (Master Information Block (MIB), System Information Block (SIB))), by other signals, or a combination. Furthermore, RRC signaling may be called a "RRC message" and may be, e.g., an RRC connection setup (RRCConnectionSetup) message, an RRC connection reconfiguration (RRCConnectionReconfiguration) message, etc.

The above-described embodiments of the present invention may be applied to a system that utilizes Long Term Evolution (LTE), LTE-Advanced (LTE-A), SUPER 3G, IMT-Advanced, 4G, 5G, Future Radio Access (FRA), CDMA2000, Ultra Mobile Broadband (UMB), IEEE 802.11

(Wi-Fi), IEEE 802.16 (WiMAX), IEEE 802.20, Ultra-Wide-Band (UWB), Bluetooth (registered trademark), or other suitable systems and/or to an enhanced next-generation system that is based on any of these systems.

The order of processes, sequences and flowcharts, etc., in the above-described embodiments of the present invention can have the order modified so long as no contradictions occur. For example, each embodiment of the methods described in the present specification proposes an example of an order of various steps but are not limited to the specified order thereof.

Up to this point, the present invention has been described in detail, however, it would be apparent for a person of ordinary skill in the art that the present invention is not limited to the embodiments described herein. The present invention can be embodied in various modified or altered forms without departing from the sprit or scope of the present invention defined by claims. Accordingly, the description is given only for illustrative purposes and is by no means intended to limit the present invention.

The invention claimed is:

1. A terminal comprising:

a receiver that receives resource information indicating a resource for transmission of a signal to be used for a synchronization and a cell recognition; and a processor that determines that the resource indicated by the resource information is not for uplink and performs time and frequency synchronization by using the signal received in the resource, wherein the receiver receives the resource information, indicating the resource for transmission of the signal to be used for the synchronization and the cell recognition, by broadcast information in one or more system information blocks (SIB), the processor determines that detecting of the signal in the resource to determine that the resource is not for uplink is omittable, the processor determines that the resource is not for uplink based on the broadcast information transmitted in the one or more SIBs, including the resource information indicating the resource for transmission of the signal to be used for the synchronization, and without needing to detect the signal in the resource to determine that the resource is not for uplink, and the processor determines that the resource is not for uplink based on the broadcast information and without needing to detect a preamble and without performing blind decoding a downlink control channel.

2. A radio communication method for a terminal comprising:

receiving resource information indicating a resource for transmission of a signal to be used for a synchronization and a cell recognition;

determining that the resource indicated by the resource information is not for uplink; and performing time and frequency synchronization by using the signal received in the resource, wherein the terminal receives the resource information, indicating the resource for transmission of the signal to be used for the synchronization and the cell recognition, by broadcast information in one or more system information blocks (SIB), the terminal determines that detecting of the signal in the resource to determine that the resource is not for uplink is omittable, the terminal determines that the resource is not for uplink based on the broadcast information transmitted in the one or more SIBs, including the resource information indicating the resource for transmission of the signal to be used for the synchronization, and without needing to detect the signal in the resource to determine that the resource is not for uplink, and the terminal determines that the resource is not for uplink based on the broadcast information and without needing to detect a preamble and without performing blind decoding a downlink control channel.

* * * * *